United States Patent [19]

Doyle

[11] Patent Number: 4,871,522

[45] Date of Patent: Oct. 3, 1989

[54] COMBINED CATALYTIC BAGHOUSE AND HEAT PIPE AIR HEATER

[75] Inventor: John B. Doyle, Massillon, Ohio

[73] Assignee: The Babcock & Wilcox Company, New Orleans, La.

[21] Appl. No.: 224,419

[22] Filed: Jul. 25, 1988

[51] Int. Cl.[4] .......................... B01J 8/00; C01B 21/00; C01B 17/00

[52] U.S. Cl. .................................. 423/239; 423/235; 423/244

[58] Field of Search ............... 423/242 A, 239, 239 A, 423/235, 235 D, 244 A, 242 R

[56] References Cited

U.S. PATENT DOCUMENTS

| | | | |
|---|---|---|---|
| 931,515 | 8/1909 | Sprague | 423/244 |
| 3,880,629 | 4/1975 | Dulin et al. | 423/244 |
| 3,928,961 | 12/1975 | Pfefferle | 60/39.02 |
| 4,186,109 | 1/1980 | Atsukawa et al. | 252/440 |
| 4,282,115 | 8/1981 | Atsukawa et al. | 252/440 |
| 4,309,386 | 1/1982 | Pirsh | 55/381 X |
| 4,345,555 | 8/1982 | Oshima et al. | 123/272 |
| 4,434,147 | 2/1984 | Dimpfl et al. | 423/235 |
| 4,474,229 | 10/1984 | Bell | 165/103 |
| 4,482,004 | 11/1984 | Grover | 165/1 |
| 4,541,864 | 9/1985 | Ratschat | 75/41 |
| 4,602,673 | 7/1986 | Michelfelder et al. | 165/7 |

OTHER PUBLICATIONS

Babcock & Wilcox Co., Statement of Interest for Commercial Demonstration of Combined $SO_2$, $NO_x$, and Particulate Control Technology (B&W SOI No. R&D 86-277).

*Primary Examiner*—Gregory A. Heller
*Attorney, Agent, or Firm*—Vytas R. Matas; Robert J. Edwards; Daniel S. Kalka

[57] ABSTRACT

A method and apparatus for controlling emissions of a coal fired boiler includes a hot catalytic baghouse for receiving flue gases along with injected ammonia and alkali. The alkali and ammonia react with $SO_x$ and $NO_x$ in the flue gas while particulates in the flue gas are trapped in the baghouse. The still hot but clean flue gases are supplied from the baghouse to a heat pipe air heater which also receives combustion air to be preheated before it is supplied to the boiler for combustion with coal to produce the flue gases.

4 Claims, 2 Drawing Sheets

COMBINED CATALYTIC BAGHOUSE AND HEAT PIPE AIR HEATER

FIELD AND BACKGROUND OF THE INVENTION

The present invention relates in general to emission control equipment for coal-fired electric power plants, and in particular to a new and useful method and apparatus for simultaneous $SO_x$, $NO_x$, and particulate control, using a hot catalytic baghouse and heat pipe air heater in combination with a coal-fired boiler.

Current energy policy in the United States is based on expanded use of coal in utility and industrial applications. This must not compromise environmental requirements however, Advanced control technologies are needed to control the increase in pollutant emissions from coal combustion. These pollutants include particulates, sulfur oxides and oxides of nitrogen.

Flyash, and other particulate material can effectively be controlled using baghouses. U.S. Pat. No. 4,309,386 assigned to the assignee of the present application, discloses a hot catalytic baghouse which simultaneously removes particulate material and reduces $NO_x$ emissions. The use of a hot catalytic baghouse which also simultaneously collects sulfur dioxide ($SO_2$), nitric oxides, and particulates, is disclosed in a U.S. patent application entitled "INTEGRATED INJECTION AND BAG FILTER HOUSE SYSTEM FOR $SO_x$—$NO_x$-PARTICULATE CONTROL WITH REAGENT/CATALYST REGENERATION", co-invented by the inventor of the present application, filed Nov. 19, 1986 and having Ser. No. 932,754, now U.S. Pat. No. 4,793,981 issued Dec. 27, 1988, which is incorporated herein by reference.

An apparatus for preheating combustion air and simultaneously reducing $NO_x$ contained in flue gases is disclosed in U.S. Pat. No. 4,602,673. By combining a catalytic reactor with an air heater, a low weight device is possible according to this patent. The catalyst will however, have to be replaced frequently because of erosion of the catalyst due to dust build-up. Another major problem not addressed by this patent is that $SO_3$, in flue gas, will poison the catalyst. This greatly reduces the effective life of a catalyst.

An air preheater using heat pipes is disclosed in U.S. Pat. No. 4,474,229. This patent also discloses a somewhat involved control mechanism that improves the operation of the heat pipe air heater.

Other references which disclose the recovery of heat from the gases of boilers or other combustors are U.S. Pat. Nos. 4,434,004, 4,482,004 and 4,541,864.

Other references that disclose the catalytic reduction of pollutants are U.S. Pat. Nos. 3,928,961, 4,186,109, 4,282,115 and 4,434,147.

A commercially available system for removing particulate and other pollutants from the flue gases of a boiler is shown in FIG. 1.

In FIG. 1, dirty flue gases exit boiler 1 in an exhaust line 2 which passes through a heat exchanger 3 where the temperature of the flue gases is reduced to about 300° F. This heat is transferred to incoming combustion air supplied by a forced draft fan 4 over a line 5.

The cooled flue gases, after leaving heat exchanger 3, pass through a particulate cleaning device 6 which may for example be an electrostatic precipitator, or bag filterhouse. The particulates are removed and the flue gas supplied over an induced draft fan 7 to a wet scrubber 8. $SO_x$ is chemically reacted with an alkali material in wet scrubber 8 and removed from the gas stream. The gas then proceeds to a heat exchanger 9 where the gas temperature is raised to approximately 800° F.

Ammonia ($NH_3$) is injected at 11 into the gas stream. The ammonia-rich gas then passes through a catalytic reactor 12 where $NO_x$ is reduced to harmless nitrogen and water. The now clean gas proceeds to stack 13 for emission to the atmosphere.

Waste products from wet scrubber 8 are supplied over line 14 to a dewatering system 15 where solids are concentrated and part of the water is returned to the scrubber. The thickened waste sludge is then supplied over a line 16 to a sludge stabilization system 17 where further dewatering takes place. Flyash is supplied to the sludge stabilization system over a line 18 from the particulate cleaning device 6. Fresh alkali is supplied to the sludge utilization system and also to the wet scrubber 8 by an alkali feed 19.

The mixing of flyash, fresh alkali and the waste sludge forms a solid disposal waste product at outlet 21.

The system of FIG. 1 is complex and expensive to install and operate.

Need remains for an apparatus and method of controlling the emissions of higher particulate and sulfur-laden, coal-fired combustion units.

SUMMARY OF THE INVENTION

The present invention is directed to a method and apparatus for controlling the emissions of three known pollutants that are generated when burning fossil fuels such as coal. The three pollutants are sulfur oxides ($SO_x$), nitric oxides ($NO_x$), and particulates. To this end, a hot catalytic baghouse is used in conjunction with a heat pipe air heater designed to recover the heat contained within the waste gases generated from the combustion of fossil fuels. The heat is used to increase the temperature of the air required for the combustion process.

The catalytic baghouse is positioned upstream of the air heater. The dirty flue gas plus alkali and ammonia are supplied to the baghouse where pollutants are removed. $SO_x$ chemically reacts with the alkali to form a solid sulfate material. $NO_x$ chemically reacts with some of the alkali material and also with the ammonia. The $NO_x$ and ammonia reaction is enhanced when the gas is passed through the catalyst that has been deposited in the baghouse and the $NO_x$ is converted to harmless nitrogen and water. The particulate formed during the combustion process and by the chemical reaction between the $SO_x$, $NO_x$, alkali and ammonia, is collected at the surface of the bag filter in the baghouse. These particulates accumulate over a period of time and are then periodically removed by isolating a compartment of the bag filterhouse and using a high energy pulse of air inside the bags to dislodge the particulates on the outside. The particulates then fall by gravity into hoppers for removal from the system.

The flue gas is thereafter supplied to the heat pipe air heater which contains a finned tube heat exchanger. The finned tube heat exchanger is advantageously coated with catalyst that will provide for a final stage of $NO_x$ reduction, if required. The clean flue gas then exits the system.

By combining the hot catalytic baghouse and heat pipe air heater in the manner of the present invention, pollutants are controlled while waste heat is recovered.

The arrangement of the present invention also avoids potential problems caused by the combination of the baghouse and heat pipe air heater.

Firstly, the overall system is potentially subject to ammonia slippage, which in itself could become a new pollutant problem. Another problem is the ability of the system to reach high levels of $NO_x$ reduction (that is greater than 90%) in a cost-effective manner. The addition of the heat pipe air heater to the system addresses both potential problems. The surface of the heat pipe can be coated with a catalyst to provide a second stage of $NO_x$ reduction which would reduce potential ammonia slippage and increase total $NO_x$ reduction.

While the heat pipe air heater is a highly efficient device, it is subject to potential problems created by pollutants contained in the flue gas generated by the combustion of fossil fuels. The particulates can cause high rates of deposition which can, in turn, result in loss of heat transfer efficiency. The sulfur oxides can be partially in the form of $SO_3$ which is acidic and can result in corrosion of the heat transfer surfaces if temperatures are reduced to low levels.

The use of the hot catalytic baghouse upstream of the heat pipe air heater addresses both of these problem areas. The particulates are removed from the gas stream prior to its reaching the air heater, thus greatly reducing any deposition potential. Sulfur oxides are also removed prior to the air heater, thus greatly reducing any possibility of acid gas attack on the heat transfer surfaces. The removal of the acid gases permits the heat pipe to be safely operated at lower end temperatures. This results in a higher rate of heat recovery and thus in a higher heat cycle efficiency.

Accordingly, an aspect of the present invention is to provide a method of controlling emissions of a fossil fuel fired boiler which produces flue gases containing $SO_x$, $NO_x$ and particulates, the flue gases being discharged from the boiler along a flue gas stream, comprising: providing a baghouse for removing the particulates, and a heat pipe air heater for heating combustion air, in series along the flue gas stream, the baghouse being upstream of the air heater, injecting alkali and ammonia into the gas stream upstream of the baghouse for reacting with the $SO_x$ and $NO_x$ in the baghouse, clean flue gas leaving the baghouse, supplying the clean flue gas to the air heater for heating the air heater, and passing combustion air through the air heater for being heated before it is supplied to the boiler.

A further aspect of the present invention is to provide an apparatus for controlling emissions of a fossil fuel fired boiler comprising a baghouse for receiving combustion flue gases from the boiler, the combustion flue gases containing $SO_x$, $NO_x$ and particulates, means for injecting alkali and ammonia into the stream of flue gas upstream of the baghouse for reaction with the $SO_x$ and $NO_x$ in the baghouse, a heat pipe air heater connected in series with the baghouse for receiving clean flue gas from the baghouse to heat the air heater, and means for supplying combustion air through the air heater to be heated by heat from the flue gas.

A still further aspect of the invention is to provide a method and apparatus for controlling the emissions of a fossil fuel fire boiler, which can economically be retrofit onto a boiler for controlling pollution emitted by the boiler in an effective manner.

DESCRIPTION OF THE PREFERRED EMBODIMENT

Figure 1:
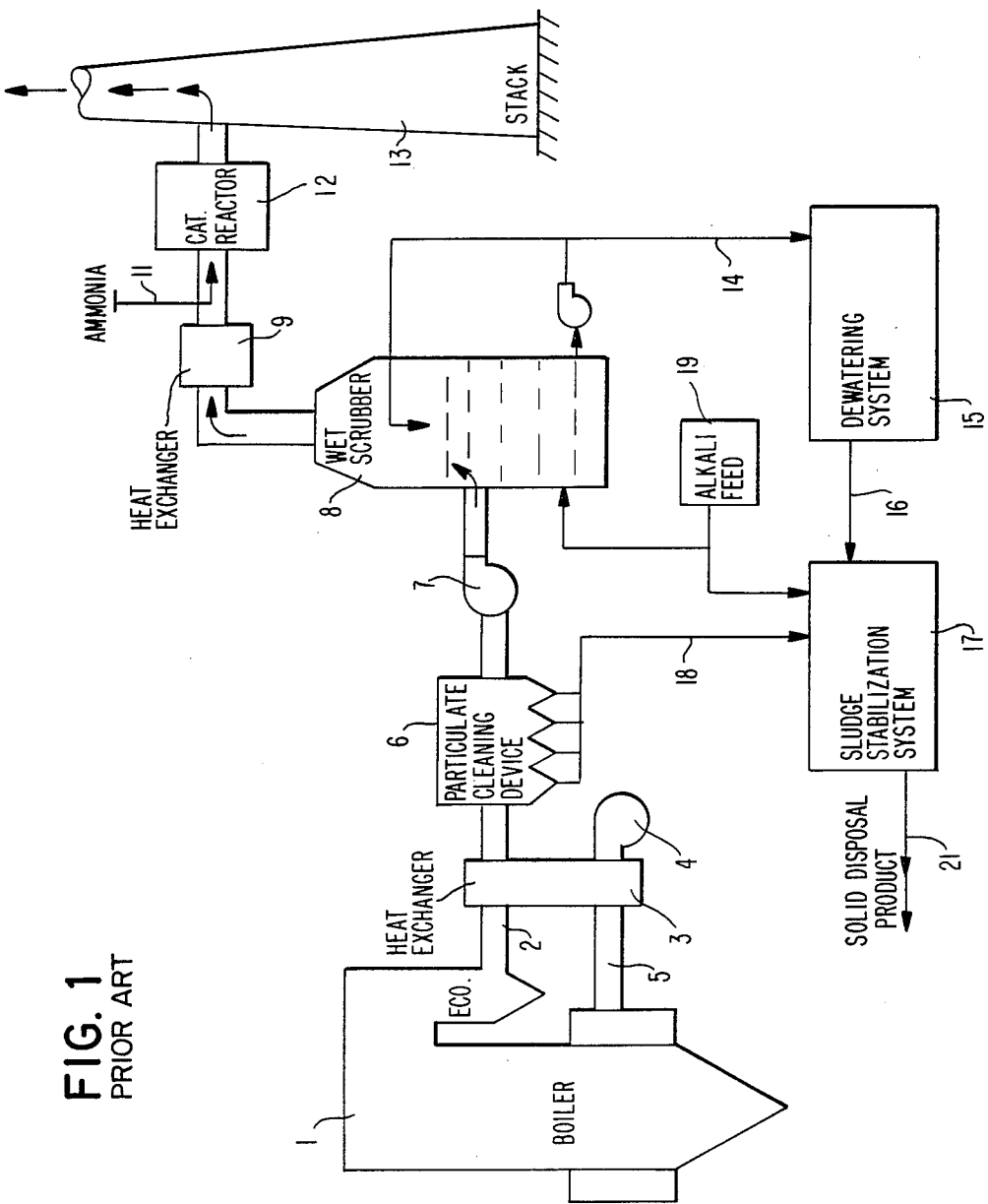
FIG. 1 is a schematic block diagram showing a commercially available system for controlling emissions in the flue gases of a boiler.
Figure 2:
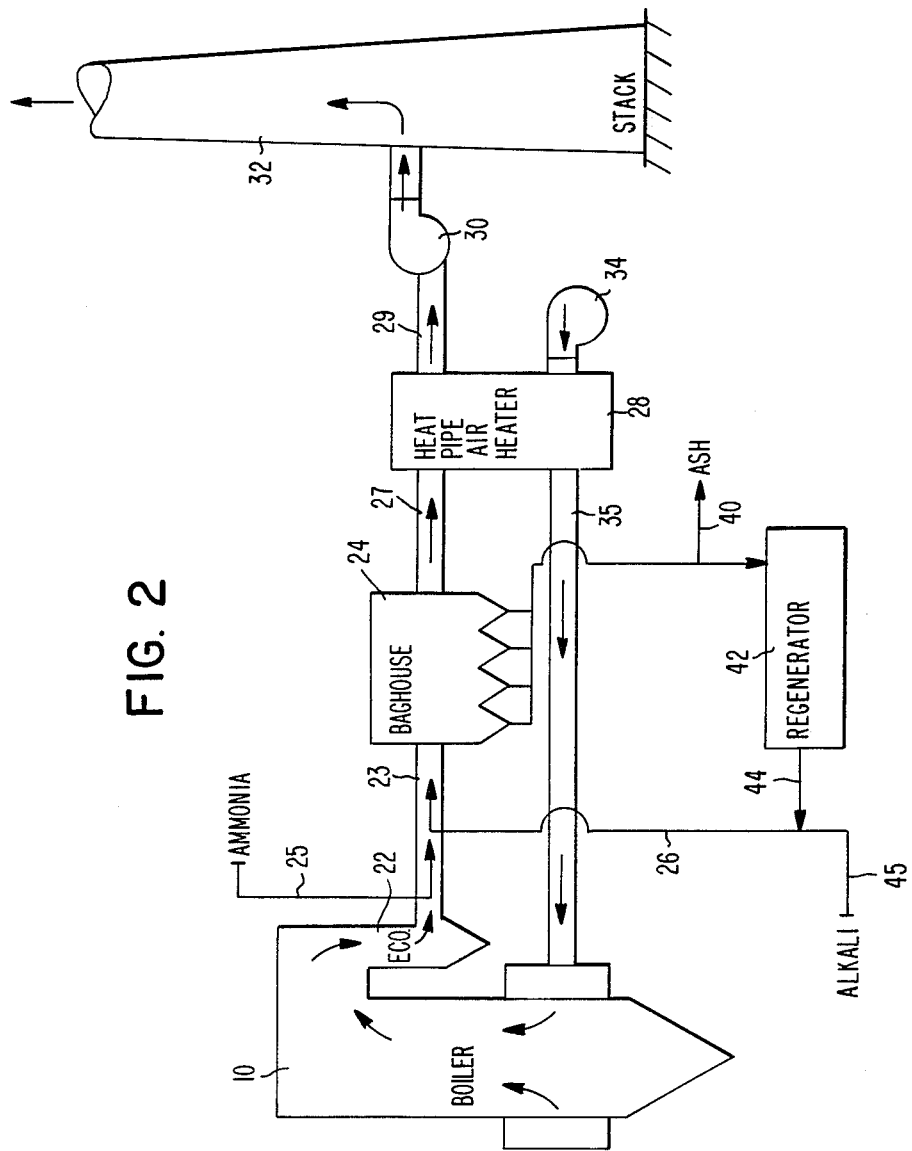
FIG. 2 is a schematic block diagram of an apparatus in accordance with the present invention for controlling emissions of a fossil fuel fired boiler.

Referring to FIG. 2, the invention embodied therein comprises an apparatus for controlling the emissions of a fossil fuel fired boiler 10, and in particular a coal-fired boiler. Boiler 10 includes an economizer 22 which receives combustion flue gases from the boiler. The flue gases are provided on a flue gas stream in an exhaust duct 23 connected to a baghouse 24. Ammonia is injected into the gas stream at 25 and alkali is injected into the gas stream at 26. Both alkali and ammonia are injected upstream of the baghouse 24. The baghouse contains, for example, ceramic fabric bags appropriate for high temperature baghouse operation.

In the baghouse 24 the $SO_x$ chemically reacts with the alkali to form a solid sulfated material. $NO_x$ chemically reacts with some of the alkali material and also with the ammonia. The $NO_x$ and ammonia reaction is enhanced when the gases pass through the catalyst that is contained in the baghouse and $NO_x$ is converted to harmless nitrogen and water. The particulate formed during the combustion process and by the chemical reaction between the $SO_x$, $NO_x$, alkali and ammonia, is collected at the surface of the bag filter. After a selected period of time the accumulation is removed in a conventional manner.

The now clean flue gas proceeds along duct 27 to a heat pipe air heater 28. One example of heat pipe air heater 28 is the horizontal gas flow heat pipe unit available from Hudson Products Corporation of Houston, Tex. The heat pipe air heater 28 is modified with tightly spaced fins to the heat pipe tubes to increase the available surface area. The air heater contains a finned tube heat exchanger that, according to the invention, is advantageously coated with a catalyst for providing a final stage of $NO_x$ reduction. This results in two positive benefits. Because of the area of tight surface spacing due to the tightly spaced fins, the first positive benefit is a smaller, more compact heat exchanger, and the second benefit is more surface to apply the catalyst to. The total effectiveness of the catalyst is directly dependent upon the total surface area available. The clean flue gas exits along duct 29 and an induction draft fan 30 to stack 32.

Fresh combustion air is supplied by fan 34 along a combustion air duct 35 through the air heater 28. Boiler 10 is thus supplied with heated combustion air.

Ash from baghouse 24 can be discharged at 40 or supplied to a regenerator 42 for regenerating the alkali or reagent/catalyst at 44. The regenerated reagent/catalyst can be mixed with fresh alkali at 45 for supply along line 26 to the flue gas stream.

By combining the baghouse and heat pipe air heater technologies in the manner shown, the system enhances the operation of both and results in a superior overall system. A major advantage of the system is in its simplicity when compared to currently available options. The simplicity of the system results in low capital costs for initial installation and low operating cost thereafter.

Among the alkali compounds tested and found useful as the reagent/catalyst, sodium bicarbonate was the most effective. By injecting sodium bicarbonate and ammonia into the flue gas stream upstream of the hot baghouse 24, $SO_x$ removal was greater than 90% and $NO_x$ removal was greater than 60%. A parametric study was conducted to optimize $SO_x/NO_x$ removal, sodium bicarbonate utilization and ammonia utilization. Conclusion from these tests revealed that optimum baghouse inlet temperatures for chemical $NO_x$ reduction was 375°–450° F. Above 585° F. the sodium nitrate product produced from the chemical reaction was not stable. The optimum baghouse inlet temperature for catalytic $NO_x$ reduction was 600°–900° F. The optimum baghouse inlet temperature for $SO_x$ reduction using sodium bicarbonate was 450°–700° F. and optimum $SO_x$ reduction using calcium oxide was 800°–1000° F.

Other potential reagents/catalyst compounds are $NaHCO_3$, nahcolite (which contains 10% "natural" $Na_2CO_3$, which was not as reactive $Na_2OO_3$ formed from $NaHOO_3$ decomposing), $Ca(OH)_2$, $CaO$, $Cu_2O$, $CuO$, $NaAlO_2$, and $ZnO$.

While a specific embodiment of the invention has been shown and described in detail to illustrate the application of the principles of the invention, it will be understood that the invention may be embodied otherwise without departing from such principles.

What is claimed is:

1. A method of controlling emissions of a fossil fuel fired boiler which produces flue gases containing $SO_x$, $NO_x$ and particulate, the flue gases being supplied along a flue gas stream, comprising the steps of:

providing a hot catalytic baghouse and a heat pipe air heater in series along the flue gas stream with the baghouse upstream of the air heater, the heat pipe air heater having heating surfaces;

coating the heating surfaces of the heat pipe air heater with catalyst for catalyzing a reaction between $NO_x$ and ammonia in the air heater;

injecting alkali and ammonia into the flue gas stream upstream of the baghouse for reacting with the $SO_x$ and $NO_x$ in the baghouse to clean the hot flue gas;

supplying the clean hot flue gas to the heat pipe air heater to heat the air heater, and to further reduce $NO_x$ in the flue gas; and passing combustion air through the heat pipe air heater for heating the air therein, the heated combustion air being for use in the boiler.

2. A method according to claim 1, further comprising the step of regenerating the reacted alkali from the baghouse for reinjection into the flue gas stream in between the boiler and the baghouse.

3. A method according to claim 1, wherein the heat pipe air heater is provided with a finned tube heat exchanger having tightly spaced fins therein.

4. A method according to claim 1 wherein the alkali is selected from the group consisting of sodium bicarbonate, sodium carbonate, nahcolite, sodium aluminate, calcium hydroxide, and oxides of calcium, copper and zinc.

* * * * *

UNITED STATES PATENT AND TRADEMARK OFFICE
CERTIFICATE OF CORRECTION

PATENT NO. : 4,871,522
DATED : Oct. 3, 1989
INVENTOR(S) : Doyle

It is certified that error appears in the above-identified patent and that said Letters Patent is hereby corrected as shown below:

In Col. 5, line 17, delete "$NaHOO_3$" and insert therefor --$NaHCO_3$--.

In Col. 5, line 18, delete "$NaHOO_3$" and insert therefor --$NaHCO_3$--.

Signed and Sealed this

First Day of January, 1991

Attest:

HARRY F. MANBECK, JR.

*Attesting Officer*  *Commissioner of Patents and Trademarks*